United States Patent
Wu

(10) Patent No.: US 11,995,741 B2
(45) Date of Patent: May 28, 2024

(54) DATA GENERATION METHOD AND APPARATUS, AND ELECTRONIC DEVICE

(71) Applicant: Qingdao Pico Technology Co., Ltd., Shandong (CN)

(72) Inventor: Tao Wu, Beijing (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/460,095

(22) Filed: Sep. 1, 2023

(65) Prior Publication Data

US 2023/0410386 A1     Dec. 21, 2023

Related U.S. Application Data

(63) Continuation of application No. PCT/CN2022/083110, filed on Mar. 25, 2022.

(30) Foreign Application Priority Data

Apr. 21, 2021   (CN) .......................... 202110431972.6

(51) Int. Cl.
*G06T 11/00*     (2006.01)
*G06T 7/11*      (2017.01)
(Continued)

(52) U.S. Cl.
CPC ................ *G06T 11/00* (2013.01); *G06T 7/11* (2017.01); *G06T 7/73* (2017.01); *G06V 10/764* (2022.01); *G06V 20/20* (2022.01)

(58) Field of Classification Search
CPC .. G06T 11/00; G06T 7/11; G06T 7/73; G06V 10/764; G06V 20/20
See application file for complete search history.

(56) References Cited

U.S. PATENT DOCUMENTS

2013/0044128 A1*  2/2013  Liu ...................... G02B 27/017
                                                345/633
2018/0137644 A1*  5/2018  Rad ....................... G06V 10/242
(Continued)

FOREIGN PATENT DOCUMENTS

CN       106249883 A      12/2016
CN       110610488 A      12/2019
(Continued)

OTHER PUBLICATIONS

International Search Report in PCT/CN2022/083110, dated May 30, 2022, 3 pages.

(Continued)

*Primary Examiner* — Jitesh Patel
(74) *Attorney, Agent, or Firm* — Astute IP Law Group

(57) ABSTRACT

Disclosed in the present disclosure are a data generation method and apparatus, and an electronic device. The method includes: obtaining first image data, the first image data representing a real environment in which a user is located; obtaining category information and plane information of a target object, the target object being an object in the first image data, and the plane information including information of an outer surface of the target object; obtaining second image data, the second image data containing a virtual object; and generating target image data by mixing the first image data with the second image data based on the category information and the plane information, the target image data containing the target object and the virtual object.

20 Claims, 1 Drawing Sheet

(51) Int. Cl.
  *G06T 7/73* (2017.01)
  *G06V 10/764* (2022.01)
  *G06V 20/20* (2022.01)

(56) References Cited

U.S. PATENT DOCUMENTS

| | | | |
|---|---|---|---|
| 2018/0253622 A1* | 9/2018 | Chen | G06N 3/08 |
| 2019/0221041 A1 | 7/2019 | Lin | |
| 2020/0111263 A1* | 4/2020 | Huang | G06Q 30/0643 |
| 2020/0311416 A1* | 10/2020 | Xiong | G06T 7/593 |
| 2021/0304503 A1* | 9/2021 | Bastov | G06F 3/04815 |

FOREIGN PATENT DOCUMENTS

| | | |
|---|---|---|
| CN | 111399654 A | 7/2020 |
| CN | 111510701 A | 8/2020 |
| CN | 111652317 A | 9/2020 |
| CN | 111666919 A | 9/2020 |
| CN | 111815786 A | 10/2020 |
| CN | 111862333 A | 10/2020 |
| CN | 111929893 A | 11/2020 |
| CN | 111931664 A | 11/2020 |
| CN | 112017300 A | 12/2020 |
| CN | 112037314 A | 12/2020 |
| CN | 112348969 A | 2/2021 |
| CN | 113269782 A | 8/2021 |

OTHER PUBLICATIONS

Office Action in CN202110431972.6, dated Jul. 1, 2022, 10 pages.
Notice of Decision of Granting Patent Right for Invention and Supplementary Search in CN202110431972.6, dated Nov. 30, 2022, 4 pages.
Wei et al., "Modeling and Presentation of Virtual Reality Object," College of Information System and Management, National University of Defence Technology, Dec. 2009, 4 pages.

* cited by examiner

DATA GENERATION METHOD AND APPARATUS, AND ELECTRONIC DEVICE

CROSS-REFERENCE TO RELATED APPLICATIONS

The present application is a continuation of International Application No. PCT/CN2022/083110 filed on Mar. 25, 2022, which claims the priority of the Chinese Patent Application No. 202110431972.6, filed on Apr. 21, 2021 and entitled "DATA GENERATION METHOD AND APPARATUS, AND ELECTRONIC DEVICE", which is incorporated herein in its entirety by reference.

TECHNICAL FIELD

The present disclosure relates to the technical field of mixed reality, and in particular to a data generation method and apparatus, and an electronic device.

BACKGROUND

At present, a Mixed Reality (MR) technology has been widely applied to various fields such as scientific visualization, medical training, engineering design, telecommuting operation, and personal entertainment. By means of the technology, a user can interact with a virtual object in a generated scene in which a real environment content is mixed with a virtual content, so that the user can better understand fun of some key data in a real environment.

However, MR data generated by the current electronic device is often crude, for example, only a large surface such as a surface of an object such as a floor, a ceiling, and a wall in the real environment is recognized, the virtual object is superimposed based on the recognized information, and therefore, there is a problem of insufficient fineness of the scene which affects the user experience.

SUMMARY

Technical Problems

An objective of an embodiment of the present disclosure is to provide a new technical solution for generating mixed reality data, so as to increase fun for the user when using an electronic device.

Technical Solutions

According to a first aspect of the present disclosure, provided is a data generation method. The method includes: obtaining first image data, the first image data representing a real environment in which a user is located; obtaining category information and plane information of a target object, the target object being an object in the first image data, and the plane information including information of an outer surface of the target object; obtaining second image data, the second image data containing a virtual object; and generating target image data by mixing the first image data with the second image data based on the category information and the plane information, the target image data containing the target object and the virtual object.

In some embodiments, said generating the target image data by mixing the first image data with the second image data based on the category information and the plane information includes: determining a relative positional relationship between the virtual object in the second image data and the target object in the first image data based on the category information; and rendering the virtual object to a predetermined position of the target object based on the plane information and the relative positional relationship, to obtain the target image data.

In some embodiments, said obtaining the category information and the plane information of the target object includes: inputting the first image data into a target image segmentation model, to obtain mask information of the target object; and obtaining the category information and the plane information based on the mask information.

In some embodiments, said obtaining the category information based on the mask information includes: inputting the mask information into a target category recognition model, to obtain the category information.

In some embodiments, said obtaining the plane information based on the mask information includes: obtaining, based on the mask information, a target image block corresponding to the target object in the first image data; obtaining, based on the target image block, target position information of a key point of the target object in a world coordinate system, the key point including a corner point of the target object; and obtaining the plane information based on the target position information and a predetermined plane fitting algorithm, the plane information including central point coordinates and a surface normal vector that correspond to each plane of the target object.

In some embodiments, the method is applied in an electronic device, and said obtaining, based on the target image block, the target position information of the key point of the target object in the world coordinate system includes: detecting first position information of the key point in the first image data based on the target image block; obtaining pose information of the electronic device at a first moment and second position information of the key point in third image data obtained at a second moment, the first moment including a current moment, and the second moment being earlier than the first moment; and obtaining the target position information based on the first position information, the pose information, and the second position information.

In some embodiments, the target image segmentation model and the target category recognition model are trained by: obtaining sample data, the sample data containing a sample object in a predetermined scene; and jointly training an initial image segmentation model and an initial category recognition model based on the sample data, to obtain the target image segmentation model and the target category recognition model.

In some embodiments, subsequent to obtaining the target image data, the method further includes: displaying the target image data.

According to a second aspect of the present disclosure, further provided is a data generation apparatus, including: a first image data obtaining module, an information obtaining module, a second image data obtaining module, and a target image data generation module. The first image data obtaining module is configured to obtain first image data, the first image data representing a real environment in which a user is located. The information obtaining module is configured to obtain category information and plane information of a target object, the target object being an object in the first image data, and the plane information including information of an outer surface of the target object. The second image data obtaining module is configured to obtain second image data, the second image data containing a virtual object. The target image data generation module is configured to generate target image data by mixing the first image data with the second image data based on the category information and the plane information, the target image data containing the target object and the virtual object.

According to a third aspect of the present disclosure, further provided is an electronic device. The electronic device includes the apparatus according to the second aspect of the present disclosure; or the electronic device includes: a memory having executable instructions stored thereon; and a processor configured to cause the electronic device, under control of the instructions, to perform the method according to the first aspect of the present disclosure.

Beneficial Effects

The present disclosure has the beneficial effects: according to the embodiments of the present disclosure, the electronic device obtains the first image data that represents the real environment in which the user is located, obtains the plane information and the category information of the target object in the first image data, and then, obtains the second image data that contains the virtual object, mixes the first image data with the second image data based on the category information and the plane information, to obtain the target image data that contains the target object and the virtual object at the same time. According to the method provided in the present embodiment, the information of the outer surface and the category information of the target object are recognized, and when the electronic device constructs the mixed reality data, the electronic device accurately combines the target object, based on the category information and the plane information of the target object, with the virtual object gathered in a virtual environment, so that the fineness of the constructed target image data is improved, then, the user experience is improved, and the fun for the user when a user uses the electronic device can be increased.

With the detailed description for exemplary embodiments of the present disclosure below with reference to accompanying drawings, other features and advantages of the present disclosure will become clearer.

BRIEF DESCRIPTION OF DRAWINGS

The accompanying drawings being incorporated into the description and constituting a part thereof show embodiments of the present disclosure, and serve to explain the principle of the present disclosure in conjunction with the descriptions therefor.

DESCRIPTION OF EMBODIMENTS

Various exemplary embodiments of the present disclosure will be described in detail with reference to the accompanying drawings. It should be noted that relative layout, digital expressions and numerical values of components and steps described in these embodiments should not be construed as limitation on the scope of the present disclosure unless otherwise specified.

The description for at least one exemplary embodiment below is only illustrative in fact and will be never used as any limitation on the present disclosure and the application or usage thereof.

The technologies, methods and devices known by the ordinary skill in the art may not be discussed in detail, and however, in a proper case, the technologies, methods and devices should be regarded as a part of the description.

In all the shown and discussed examples, any specific values should be explained to be exemplary only, but are not used as limitations. Therefore, other examples of the exemplary embodiments may have different values.

It should be noted that similar numerals and letters represent similar items in the following accompanying drawings, and therefore, once a certain item is defined in one of the accompanying drawings, it is unnecessary to further discuss the item in the subsequent accompanying drawings.

When generating mixed reality data, the current electronic device often recognizes a large surface in a real environment only, but cannot recognize an object and a type of the object in the real environment. For example, after collecting image data in the real environment, the electronic device does not know that one surface in the image data corresponds to a desk, and another surface corresponds to a chair, which leads to a crude mixed reality scene obtained by combination with a virtual content based on the image data. For example, the electronic device cannot precisely determine a relative positional relationship, such as an up-down relationship, between a real object in a real world and a virtual object in a virtual world; but the electronic device simply superimposes and displays the virtual object on a certain position in a real image environment. Therefore, an existing method for generating the mixed reality data has a problem of insufficient fineness, which may further affect the user experience.

Figure 1:
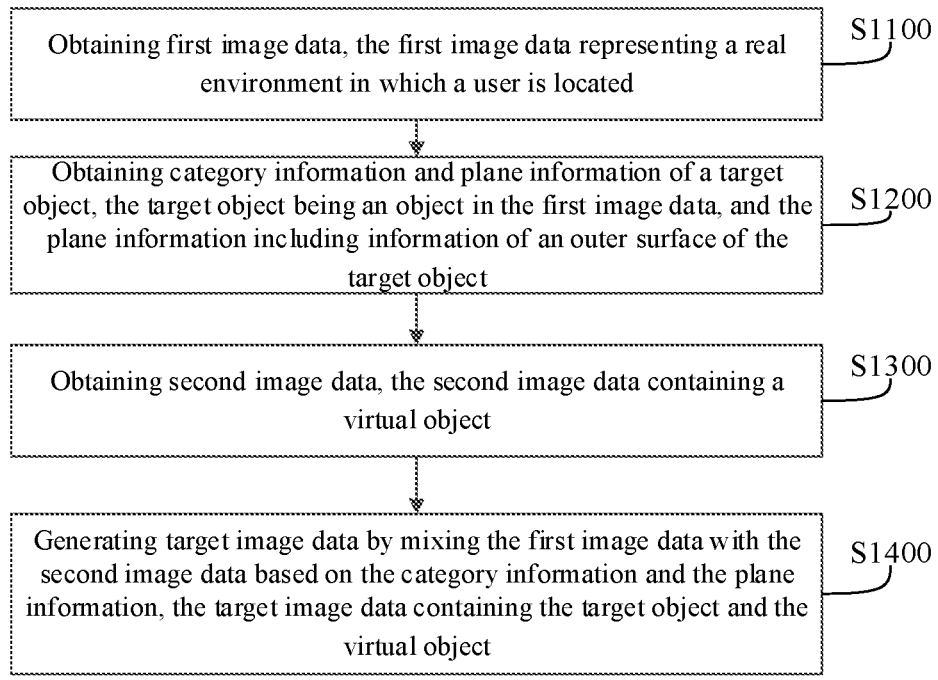
FIG. 1 is a schematic flowchart of a data generation method according to an embodiment of the present disclosure.

In order to solve the above-mentioned problems, embodiments of the present disclosure provide a data generation method. FIG. 1 is a schematic flowchart of a data generation method according to an embodiment of the present disclosure. The method may be applied in an electronic device, so that the device can generate mixed reality data with high fineness and display the data to be viewed by a user, and the user experience is improved.

It should be noted that, in the present embodiment, the electronic device implementing the method may include a display apparatus such as a display screen and at least two image collecting apparatuses configured to collect real environment information. During specific implementation, each of the image collecting apparatuses may be a monochrome camera with a collecting range about 153° *120° *167° (H*V*D), a resolution ratio not smaller than 640*480, and a frame rate not smaller than 30 Hz. Of course, the image collecting apparatus may also be a camera with other configurations as required. However, the wider the collecting range is, the greater the optical distortion of the camera is, which may affect the precision of final data. During specific implementation, the electronic device may be a device such as a VR device, an AR device or an MR device.

As shown in FIG. 1, the method of the present embodiment may include steps S1100 to S1400, which will be described in detail as follows.

Step S1100, first image data is obtained, the first image data representing a real environment in which a user is located.

Specifically speaking, the first image data may be data that reflects a real environment in which a user is located, i.e., data that reflects a real physical environment. The image data may include various entity objects in a real environment, for example, the image data may include objects such as a sofa, a dining table, a tree, a building, a car, and a road according to different scenes where a user is located.

In the present embodiment, the first image data may be generated by the at least two image collecting apparatuses disposed on the electronic device collecting the data in the real environment where the user is located. Of course, during specific implementation, the first image data may be generated by devices other than the electronic device collecting the data in the real environment where the user is located. For example, the first image data may be obtained by an image collecting apparatus that is disposed separately in an environment where a user is located, and the image collecting apparatus may provide the first image data to the electronic device by establishing a connection with the electronic device. In the present embodiment, the way of obtaining the first image data is not specially limited.

Step S1200, category information and plane information of a target object are obtained, the target object being an object in the first image data, and the plane information including information of an outer surface of the target object.

In the present embodiment, the target object may be one or more objects corresponding to the entity object in the real environment in the first image data. For example, the target object may be an object corresponding to an object such as a desk, a chair, and a sofa in the real environment.

The plane information of the target object may be the information of the outer surface of the target object and may be specifically information that represents an attribute such as a position and a size of the outer surface of the target object. For example, the information may be central coordinate data of a certain outer surface of the target object and a normal vector of the outer surface, so as to represent the position and size of the outer surface at the same time.

The category information of the target object may be information that represents an object type of the target object. For example, when the target object is a sofa, the category information may be "furniture" or may be "sofa" directly. During specific implementation, the category information of the target object may be set as required, for example, the category information of the target object may be information of a primary category to which the object attributes or information of a secondary category to which the object attributes. In addition, the category information may also be denoted by an identifier of the object type, for example, "0" represents furniture, "1" represents a sofa, which will not be repeated herein.

In an embodiment, the step of obtaining the category information and the plane information of the target object includes: inputting the first image data into a target image segmentation model, to obtain mask information of the target object; and obtaining the category information and the plane information based on the mask information.

In the embodiment, the step of obtaining the category information based on the mask information includes: inputting the mask information into a target category recognition model, to obtain the category information.

In the field of digital image processing, the mask information may be specifically information that is used to shield a (all or part of) to-be-processed image, to control an image processing region or a processing process. During specific implementation, a mask may be a two-dimensional matrix array or a multi-value image, so as to be used to extract a region of interest, i.e., a region to which the user pay attention, in the to-be-processed image. For example, the mask is multiplied by the to-be-processed image, so that image values of other regions of the to-be-processed image are 0, and image values of the region of interest are unchanged.

In the present embodiment, specifically, the mask information of the target object is obtained by the pretrained target image segmentation model; and then, the category information of the target object is recognized by the pretrained target category recognition model based on the mask information, and the plane information of the target object is calculated based on the mask information. How to train the target image segmentation model and the target category recognition model will be firstly described below.

In the present embodiment, a target image segmentation model is a model for segmenting the object from a carrier, for example, the target object is segmented from a carrier image thereof, so that the target objected is used for subsequent virtuality and reality combination processing. During specific implementation, the target image segmentation model may be a convolutional neural network model, for example, it may be a model based on a Mask R-CNN structure, which will not be specially limited herein.

The target category recognition model is a model for recognizing, based on the input mask information, a category to which an object corresponding to the mask information attributes. For example, in a case that the target object is a sofa, a category of the target object may be obtained as "furniture" by inputting the mask information of the target object into the target category recognition model, and furthermore, the category of the target object may be recognized as "sofa". During specific implementation, the target category recognition model may be a convolutional neural network model, and a model structure thereof will not be repeated herein.

In the present embodiment, the target image segmentation model and the target category recognition model may be trained by: obtaining sample data, the sample data containing a sample object in a predetermined scene; and jointly training an initial image segmentation model and an initial category recognition model based on the sample data, to obtain the target image segmentation model and the target category recognition model.

During specific implementation, environment image data in different scenes may be obtained in advance as the sample data, for example, environment image data in 128 predetermined scenes may be obtained, and sample data for training the target image segmentation model and the target category recognition model may be obtained by manually annotating an object in each piece of environment image data; and then, an initial image segmentation model corresponding to the target image segmentation model and an initial category recognition model corresponding to the target category recognition model may be jointly trained based on the sample data, to obtain the target image segmentation model and the target category recognition model.

In an embodiment, said the step of jointly training the initial image segmentation model and the initial category recognition model based on the sample data, to obtain the target image segmentation model and the target category recognition model includes: inputting the sample data into the initial image segmentation model, to obtain sample mask information of the sample object; and inputting the sample mask information into the initial category recognition model, to obtain sample category information of the sample object; and adjusting parameters of the initial image segmentation model and the initial category recognition model during training, to obtain the target image segmentation model and the target category recognition model that satisfy predetermined convergency conditions.

Specifically speaking, after the sample data is obtained, the sample mask information of the sample object is obtained by inputting the sample data into the initial image segmentation model; then, the sample category information of the sample object is obtained by processing the sample mask information by using the initial category recognition model; and the target image segmentation model and the target category recognition model that satisfy the predetermined convergency conditions are obtained by designing loss functions corresponding to the two models and continuously adjusting the parameters respectively corresponding to the two models during joint training. The predetermined convergency conditions may be, for example, that errors of recognition results of the two models do not exceed predetermined thresholds. Detailed processing for model training is described in detail in the prior art, and details thereof will not be repeated herein.

How to train the target image segmentation model and the target category recognition model has been described as above. During specific implementation, in the process that the mask information of the target object in the first image data is recognized based on the target image segmentation model and the category information of the target object is obtained based on the mask information, the plane information of the target object may also be obtained based on the mask information. How to obtain the plane information will be described in detail as below.

In an embodiment, the step of obtaining the plane information based on the mask information includes: obtaining a target image block corresponding to the target object in the first image data based on the mask information; obtaining target position information of a key point of the target object in a world coordinate system based on the target image block, the key point including a corner point of the target object; and obtaining the plane information based on the target position information and a predetermined plane fitting algorithm, the plane information including central point coordinates and a surface normal vector that correspond to each plane of the target object.

The target image block is an image block formed by pixels for forming the target object in the first image data.

Specifically speaking, in order to precisely recognize the information of the outer surface of the target object to improve the fineness of the target image data to be obtained, in the present embodiment, after the target image block corresponding to the target object in the first image data is obtained, target position information of each key point, such as the corner point, forming the target object, i.e., three-dimensional position coordinates of each key point in a real world coordinate system, may be detected and obtained; and then, information of each outer surface of the target object may be fitted by using the predetermined plane fitting algorithm, to obtain the plane information.

It should be noted that the predetermined plane fitting algorithm may be, for example, a least-square plane fitting algorithm or other algorithms, which are not specially limited thereto.

In an embodiment, when obtaining, based on the target image block, the target position information of the key point of the target object in the world coordinate system, the electronic device may be configured to: detect first position information of the key point in the first image data based on the target image block; obtain pose information of the electronic device at a first moment and second position information of the key point in third image data obtained at a second moment, the first moment including a current moment, and the second moment being earlier than the first moment; and obtain the target position information based on the first position information, the pose information, and the second position information.

The first position information may be two-dimensional coordinate data of the key point of the target object in the first image data; and the pose formation of the electronic device may be calculated based on system parameters of the image collecting apparatuses carried by the electronic device, which is not repeated herein.

The second position information may be image data, i.e., two-dimensional coordinate data in a historical image frame, collected for the key point of the target object at a historical moment earlier than the current moment.

During specific implementation, a position trajectory of the key point at the first moment is predicted based on the second position information of the key point at the second moment, so that the first position information is corrected based on the position trajectory; and finally, the target position information, i.e., the three-dimensional coordinate data, of the key point in the world coordinate system may be obtained based on the first position information and the pose information of the electronic device.

After step S1200, step S1300 of obtaining the second image data is performed, the second image data containing a virtual object.

The virtual object may be an object which does not exist in a real environment where a user is located, i.e., a virtual content. For example, the virtual object may be an animal, a plant, a building, etc. in a virtual world, which is not specially limited thereto.

It should be noted that, in the present embodiment, the first image data that contains the target object and the second image data that contains the virtual object may be two-dimensional data or three-dimensional data, which is not specially limited thereto in the present embodiment.

Step S1400, target image data is generated by mixing the first image data with the second image data based on the category information and the plane information, the target image data containing the target object and the virtual object.

Specifically speaking, after the plane information and the category information of the target object in the first image data that reflect the real environment where the user is located and the second image data that contains the to-be-mixed virtual object are obtained in the above-mentioned steps, the target object in the first image data may be segmented based on the plane information and the category information, and may be mixed with the virtual object in the second image data, to obtain the target image data that contains the target object in the real environment and the virtual object in the virtual environment at the same time.

In an embodiment, the step of generating the target image data by mixing the first image data with the second image data based on the plane information and the category information includes: determining a relative positional relationship between the virtual object in the second image data and the target object in the first image data based on the category information; and rendering the virtual object to a predetermined position of the target object based on the plane information and the relative positional relationship, to obtain the target image data.

After the target image data in which the target object is mixed with the virtual object is obtained in above processing, the method further includes: displaying the target image data.

Specifically speaking, in order to facilitate user's interaction based on the target object in the real environment and the virtual object in the virtual environment, after obtaining the above-mentioned target image data, the electronic device may display the target image data on a display screen of the electronic device. Furthermore, an interaction content that a user interacts with the virtual object based on the displayed target image data may be further obtained. For example, in a case that the virtual object is a cat, the user may interact with the virtual cat and a corresponding interaction video is saved.

In order to further increase the fun for the user when the user uses the electronic device, the electronic device may further include a network module. After the Internet is connected to the network module, the electronic device may further save the interaction data, such as image data and/or video data, of interaction between the user and the virtual object in the target image data, and provide the interaction data to other users, such as friends of the user, and the detailed processing processes will not be repeated herein. Of course, the above description is only an example, in which the method is applied, in the present embodiment. During specific implementation, the method may also be applied in a scene such as wall posters, network social communication, virtual telecommuting, personal games, and advertising, which will not be repeated herein.

In conclusion, according to the data generation method in the present embodiments, the electronic device obtains the first image data that represents the real environment in which the user is located, obtains the plane information and the category information of the target object in the first image data, and then, obtains the second image data that contains the virtual object, and the electronic device obtains, by mixing the first image data with the second image data based on the category information and the plane information, the target image data that contains the target object and the virtual object at the same time. According to the method according to the present embodiments, by recognizing the information of the outer surface and the category information of the target object, when the electronic device constructs the mixed reality data, the electronic device can accurately combine the target object, based on the category information and the plane information of the target object, with the virtual object gathered in a virtual environment, so that the fineness of the constructed target image data is improved, and then, the user experience is improved.

Figure 2:
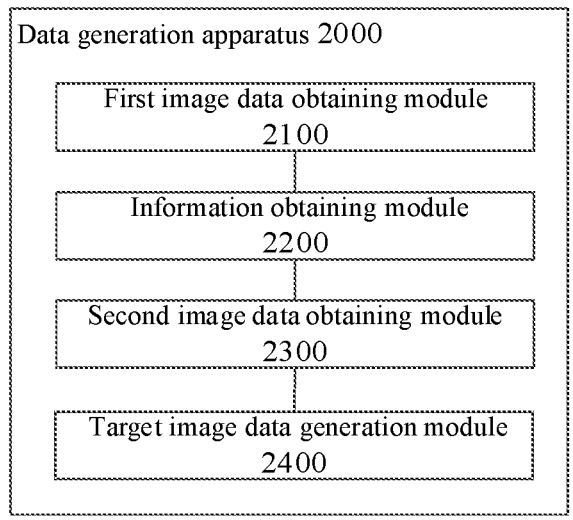
FIG. 2 is a block diagram of a principle of a data generation apparatus according to an embodiment of the present disclosure.

In correspondence to the above-mentioned method embodiments, the present embodiments further provide a data generation apparatus. As shown in FIG. 2, the apparatus 2000 may be applied in an electronic device and may specifically include a first image data obtaining module 2100, an information obtaining module 2200, a second image data obtaining module 2300, and a target image data generation module 2400.

The first image data obtaining module 2100 is configured to obtain first image data, the first image data representing a real environment in which a user is located.

The information obtaining module 2200 is configured to obtain category information and plane information of a target object, the target object being an object in the first image data, and the plane information including information of an outer surface of the target object.

In an embodiment, when obtaining the category information and the plane information of the target object, the information obtaining module 2200 may be configured to input the first image data into a target image segmentation model, to obtain mask information of the target object; and obtain the category information and the plane information based on the mask information.

In an embodiment, when obtaining the category information based on the mask information, the information obtaining module 2200 may be configured to input the mask information into a target category recognition model, to obtain the category information.

In an embodiment, when obtaining the plane information based on the mask information, the information obtaining module 2200 may be configured to obtain, based on the mask information, a target image block corresponding to the target object in the first image data; obtain, based on the target image block, target position information of a key point of the target object in a world coordinate system, the key point including a corner point of the target object; and obtain the plane information based on the target position information and a predetermined plane fitting algorithm, the plane information including central point coordinates and a surface normal vector that correspond to each plane of the target object.

In an embodiment, the apparatus 2000 is applied in an electronic device. When obtaining, based on the target image block, the target position information of the key point of the target object in the world coordinate system, the information obtaining module 2200 may be configured to detect first position information of the key point in the first image data based on the target image block; obtain pose information of the electronic device at a first moment and second position information of the key point in third image data obtained at a second moment, the first moment including a current moment, and the second moment being earlier than the first moment; and obtain the target position information based on the first position information, the pose information, and the second position information.

The second image data obtaining module 2300 is configured to obtain second image data, the second image data containing a virtual object.

The target image data generation module 2400 is configured to generate target image data by mixing the first image data with the second image data based on the category information and the plane information, the target image data containing the target object and the virtual object.

In an embodiment, when generating the target image data by mixing the first image data with the second image data based on the category information and the plane information, the target image data generation module 2400 may be configured to determine a relative positional relationship between the virtual object in the second image data and the target object in the first image data based on the category information; and render the virtual object to a predetermined position of the target object based on the plane information and the relative positional relationship, to obtain the target image data.

In an embodiment, the apparatus 2000 further include a display module configured to display the target image data after obtaining the target image data.

In correspondence to the above-mentioned method embodiments, the present embodiments further provide an electronic device which may include the data generation apparatus 2000 according to any embodiment of the present disclosure, and the data generation apparatus 2000 is configured to implement the data generation method according to any embodiment of the present disclosure.

Figure 3:
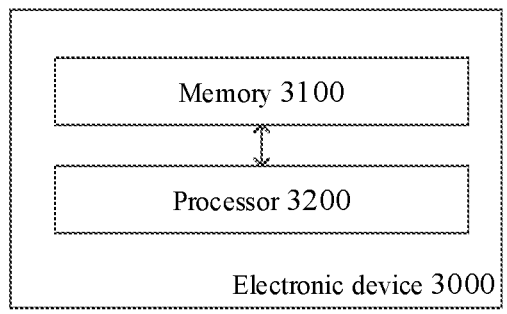
FIG. 3 is a schematic diagram of a hardware structure of an electronic device according to an embodiment of the present disclosure.

As shown in FIG. 3, the electronic device 3000 may include a processor 3200 and a memory 3100. The memory 3100 has executable instructions stored thereon; and the processor 3200 is configured to cause the electronic device, under control of the instructions, to perform the data generation method according to any embodiment of the present disclosure.

All the modules of the above-mentioned apparatus 2000 may be implemented by causing the processor 3200 to execute the instructions to perform the method according to any embodiment of the present disclosure.

During specific implementation, the electronic device 3000 may include a display apparatus, such as a display screen, and at least two image collecting apparatuses configured to collect real environment information. During specific implementation, each of the image collecting apparatuses may be a monochrome camera with a collecting range about 153° *120° *167° (H*V*D), a resolution ratio not smaller than 640*480, and a frame rate not smaller than 30 Hz. Of course, the image collecting apparatus may be a camera with other configurations as required. However, the wider the collecting range is, the greater the optical distortion of the camera is, which may affect the precision of final data. During specific implementation, the electronic device may be a device such as a VR device, an AR device or an MR device.

The present disclosure may be a system, a method and/or a computer program product. The computer program product may include a computer-readable storage medium. The computer-readable storage medium has computer-readable program instructions stored thereon, and the computer-readable program instructions enable a processor to implement various aspects of the present disclosure.

The computer-readable storage medium may be a tangible device capable of holding and storing instructions used by an instruction execution device. The computer-readable storage medium may include, for example, but is not limited to an electric storage device, a magnetic storage device, an optical storage device, an electromagnetic storage device, a semiconductor storage device, or any appropriate combinations thereof. A more specific example (a non-exhaustive list) of the computer-readable storage medium includes a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital video disk (DVD), a memory stick, a floppy disk, a mechanical encoding device, such as a punched card storing an instruction or a protruding structure in a groove, and any appropriate combinations thereof. The computer-readable storage medium used herein is not explained as an instantaneous signal itself such as radio waves or other freely propagated electromagnetic waves, electromagnetic waves propagated via waveguides or other transmission media (such as an optical pulse of an optical fiber cable), or an electric signal transmitted by a wire.

The computer-readable program instructions described herein may be downloaded from the computer-readable storage medium to each computing/processing device, or downloaded to an external computer or an external storage device through a network such as the Internet, a local area network, a wide-area network and/or a wireless network. The network may include a copper transmission cable, optical fiber transmission, wireless transmission, a router, a firewall, a switch, a gateway computer and/or an edge server. The computer-readable program instructions are received by a network adapter card or a network interface in each computing/processing device and are transmitted so as to be stored in the computer-readable storage medium in each computing/processing device.

The computer program instruction for performing the operation in the present disclosure may be an assembly instruction, an instruction set architecture (ISA) instruction, a machine instruction, a machine-relevant instruction, a microcode, a firmware instruction, state setting data, or a source code or target code compiled by one or any combination of various programming languages, and the programming languages include object-oriented programming languages, such as Smalltalk and C++, and conventional procedural programming languages, such as "C" languages or similar programming languages. The computer-readable program instruction may be completely executed on a user computer, partially executed on the user computer, executed as an independent software package, partially executed on the user computer and partially executed on a remote computer, or completely executed on the remote computer or a server. In a case that the remote computer is involved, the remote computer may be connected to the user computer through any kind of network including a local area network (LAN) or a wide area network (WAN), or may be connected to an external computer (for example, connected through an Internet service provider by means of the Internet). In some embodiments, an electronic circuit such as a programmable logic circuit, a field-programmable gate array (FPGA) or a programmable logic array (PLA) may be customized individually by utilizing state information of the computer-readable program instruction, and the electronic circuit may execute the computer-readable program instruction, to implement various aspects of the present disclosure.

Various aspects of the present disclosure are described with reference to a flowchart and/or a block diagram of a method, apparatus (system) and computer program product according to the embodiments of the present disclosure. It should be understood that each block in the flowchart and/or the block diagram as well as a combination of all the blocks in the flowchart and/or the block diagram may be implemented by computer-readable program instructions.

These computer-readable program instructions may be provided to a general-purpose computer, a special-purpose computer, or processors of other programmable data processing apparatuses to generate a machine, so that an apparatus for implementing specified functions/actions in one or more blocks of the flowchart and/or the block diagram is generated when the instructions are executed by the computer or the processors of other programmable data processing apparatuses. These computer-readable program instructions may also be stored in a computer-readable storage medium; and these instructions enable the computer, the programmable data processing apparatuses and/or other devices to operate in a specified way, so that a computer-readable medium storing instructions includes a product including the instructions for implementing various aspects of the specified functions/actions in one or more blocks of the flowchart and/or the block diagram.

These computer-readable program instructions may also be loaded in the computer or other programmable data processing apparatuses, or other devices, so that a series of operation steps are performed on the computer or other programmable data processing apparatuses, or other devices to generate a process realized by the computer, and furthermore, the instructions executed on the computer or other programmable data processing apparatuses, or other devices implement the specified functions/actions in one or more blocks of the flowchart and/or the block diagram.

The flowchart and the block diagram in the accompanying drawings show possibly-implemented system architectures, functions and operations of the system, method and computer program product according to a plurality of embodiments of the present disclosure. In this regard, each block in the flowchart or the block diagram may represent a part of a module, a program segment or an instruction, and a part of the module, the program segment or the instruction includes one or more executable instructions for implementing specified logic functions. In some implementations as alternations, functions marked in the blocks may occur in an order different from an order marked in the accompanying drawings. For example, in fact, two continuous blocks may be performed approximately concurrently, and sometimes, they may also be performed in an opposite order, which depends on the involved functions. It should be further noted that each block in the flowchart and/or the process diagram and combinations of the blocks in the flowchart and/or the process diagram may be implemented by a special-purpose hardware-based system executing the specified functions or actions, or may be implemented by a combination of special-purpose hardware and computer instructions. It is known by the skilled in the art that an implementation in a hardware way, an implementation in a software way and an implementation in a software and hardware combination way are equivalent.

All the embodiments of the present disclosure have been described as above, the foregoing description is illustrative, is non-exhaustive, and is not limited to all the disclosed embodiments. Many modifications and variations will be apparent to those of ordinary skill in the art without departing from the scope and spirit of all the embodiments described. The selection for the terms used herein aims at better explaining the principles of all the embodiments, actual applications or technical improvements on the market or making other ordinary skill in the art understand all the embodiments disclosed herein. The scope of the present disclosure is limited by the appended claims.

What is claimed is:

1. A data generation method, comprising:
   obtaining first image data, the first image data representing a real environment in which a user is located;
   obtaining category information of a target, the target object being an object in the first image data;
   obtaining plane information of the target object based on target position information of a key point of the target object in a world coordinate system, the plane information comprising information of an outer surface of the target object;
   obtaining second image data, the second image data containing a virtual object; and
   generating target image data by mixing the first image data with the second image data based on the category information and the plane information, the target image data containing the target object and the virtual object.

2. The method according to claim 1, wherein said generating the target image data by mixing the first image data with the second image data based on the category information and the plane information comprises:
   determining a relative positional relationship between the virtual object in the second image data and the target object in the first image data based on the category information; and
   rendering the virtual object to a predetermined position of the target object based on the plane information and the relative positional relationship, to obtain the target image data.

3. The method according to claim 1, wherein said obtaining the category information of the target object comprises:
   inputting the first image data into a target image segmentation model, to obtain mask information of the target object; and
   obtaining the category information based on the mask information.

4. The method according to claim 3, wherein said obtaining the category information based on the mask information comprises:
   inputting the mask information into a target category recognition model, to obtain the category information.

5. The method according to claim 3, wherein said obtaining the plane information based on the mask information comprises:
   obtaining, based on the mask information, a target image block corresponding to the target object in the first image data;
   obtaining, based on the target image block, the target position information of the key point of the target object in the world coordinate system, the key point comprising a corner point of the target object; and
   obtaining the plane information based on the target position information and a predetermined plane fitting algorithm, the plane information comprising central point coordinates and a surface normal vector that correspond to each plane of the target object.

6. The method according to claim 5, wherein the method is applied in an electronic device, and said obtaining, based on the target image block, the target position information of the key point of the target object in the world coordinate system comprises:
   detecting first position information of the key point in the first image data based on the target image block;
   obtaining pose information of the electronic device at a first moment and second position information of the key point in third image data obtained at a second moment, the first moment comprising a current moment, and the second moment being earlier than the first moment; and
   obtaining the target position information based on the first position information, the pose information, and the second position information.

7. The method according to claim 4, wherein the target image segmentation model and the target category recognition model are trained by:
   obtaining sample data, the sample data containing a sample object in a predetermined scene; and
   jointly training an initial image segmentation model and an initial category recognition model based on the sample data, to obtain the target image segmentation model and the target category recognition model.

8. The method according to claim 1, timber comprising, subsequent to said obtaining the target image data:
   displaying the target image data.

9. The method according to claim 1, wherein said obtaining the plane information of the target object comprises:
   inputting the first image data into a target image segmentation model, to obtain mask information of the target object; and
   obtaining the plane information based on the mask information.

10. The method according to claim 9, wherein the target image segmentation model is trained by:
    obtaining sample data, the sample data containing a sample object in a predetermined scene; and
    training an initial image segmentation model based on the sample data, to obtain the target image segmentation model.

11. An electronic device, comprising:
a memory having executable instructions stored thereon; and
a processor configured to cause, under control of the instructions, the electronic device to:
obtain first image data, the first image data representing a real environment in which a user is located;
obtain category information of a target object, the target object being an object in the first image data;
obtain plane information of the target object based on target position information of a key point of the target object in a world coordinate system, the plane information comprising information of an outer surface of the target object;
obtain second image data, the second image data containing a virtual object; and
generate target image data by mixing the first image data with the second image data based on the category information and the plane information, the target image data containing the target object and the virtual object.

12. The electronic device according to claim 11, wherein said generating the target image data by mixing the first image data with the second image data based on the category information and the plane information comprises:
determining a relative positional relationship between the virtual object in the second image data and the target object in the first image data based on the category information; and
rendering the virtual object to a predetermined position of the target object based on the plane information and the relative positional relationship, to obtain the target image data.

13. The electronic device according to claim 11, wherein said obtaining the category information of the target object comprises:
inputting the first image data into a target image segmentation model, to obtain mask information of the target object; and
obtaining the category information based on the mask information.

14. The electronic device according to claim 13, wherein said obtaining the category information based on the mask information comprises:
inputting the mask information into a target category recognition model, to obtain the category information.

15. The electronic device according to claim 13, wherein said obtaining the plane information based on the mask information comprises:
obtaining, based on the mask information, a target image block corresponding to the target object in the first image data;
obtaining, based on the target image block, the target position information of the key point of the target object in the world coordinate system, the key point comprising a corner point of the target object; and
obtaining the plane information based on the target position information and a predetermined plane fitting algorithm, the plane information comprising central point coordinates and a surface normal vector that correspond to each plane of the target object.

16. The electronic device according to claim 15, wherein said obtaining, based on the target image block, the target position information of the key point of the target object in the world coordinate system comprises:
detecting first position information of the key point in the first image data based on the target image block;
obtaining pose information of the electronic device at a first moment and second position information of the key point in third image data obtained at a second moment, the first moment comprising a current moment, and the second moment being earlier than the first moment; and
obtaining the target position information based on the first position information, the pose information, and the second position information.

17. The electronic device according to claim 14, wherein the target image segmentation model and the target category recognition model are trained by:
obtaining sample data, the sample data containing a sample object in a predetermined scene; and
jointly training an initial image segmentation model and an initial category recognition model based on the sample data, to obtain the target image segmentation model and the target category recognition model.

18. The electronic device according to claim 11, wherein subsequent to obtaining the target image data, the processor is further configured to cause, under control of the instructions:
display the target image data.

19. The electronic device according to claim 11, wherein said obtaining the plane information of the target object comprises:
inputting the first image data into a target image segmentation model, to obtain mask information of the target object; and
obtaining the plane information based on the mask information.

20. The electronic device according to claim 19, wherein the target image segmentation model is trained by:
obtaining sample data, the sample data containing a sample object in a predetermined scene; and
training an initial image segmentation model based on the sample data, to obtain the target image segmentation model.

* * * * *